United States Patent
Hargreaves et al.

(10) Patent No.: US 11,868,555 B2
(45) Date of Patent: *Jan. 9, 2024

(54) LOW LATENCY INPUT OBJECT DETECTION UNDER LOW GROUND MASS CONDITION

(71) Applicant: Synaptics Incorporated, San Jose, CA (US)

(72) Inventors: Kirk Hargreaves, Mountain View, CA (US); Guozhong Shen, San Jose, CA (US); Ching-Hsung Wang, San Jose, CA (US); Guan-Hua Cao, Shanghai (CN)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/104,248

(22) Filed: Jan. 31, 2023

(65) Prior Publication Data
US 2023/0176679 A1  Jun. 8, 2023

Related U.S. Application Data

(63) Continuation of application No. 17/522,679, filed on Nov. 9, 2021, now Pat. No. 11,592,925.

(51) Int. Cl.
*G06F 3/041* (2006.01)
*G06F 3/044* (2006.01)

(52) U.S. Cl.
CPC .......... *G06F 3/0416* (2013.01); *G06F 3/0441* (2019.05); *G06F 3/04186* (2019.05);
(Continued)

(58) Field of Classification Search
CPC .... G06F 3/0416; G06F 3/0441; G06F 3/0442; G06F 3/044; G06F 3/0443; G06F 3/0445;
(Continued)

(56) References Cited

U.S. PATENT DOCUMENTS

| 10,719,177 | B2 | 7/2020 | Pedersen |
| 10,921,942 | B2 | 2/2021 | Chen |

(Continued)

FOREIGN PATENT DOCUMENTS

| CN | 111902798 A | * | 11/2020 | ......... G06F 3/03545 |
| CN | 112578918 A | * | 3/2021 | ......... G06F 3/03545 |

(Continued)

*Primary Examiner* — Darlene M Ritchie
(74) *Attorney, Agent, or Firm* — Leydig, Voit & Mayer, Ltd.

(57) ABSTRACT

A processing system configured to detect an input object proximate the processing system. The processing system includes sensor circuitry configured to make a determination, when the processing system is in a low ground mass (LGM) state, that a large object is proximate to sensor electrodes of the processing system. The sensor circuitry is further configured, in response to a determination that a large object is proximate the sensor electrodes while the processing system is in the LGM state, to drive a first group of sensor electrodes with one of an inverted signal or a non-inverted signal and drive a second group of sensor electrodes with a static DC voltage.

20 Claims, 7 Drawing Sheets

(52) U.S. Cl.
CPC .. *G06F 3/0442* (2019.05); *G06F 2203/04108* (2013.01); *G06F 2203/04114* (2019.05)

(58) Field of Classification Search
CPC .. G06F 3/0446; G06F 3/0418; G06F 3/03545; G06F 2203/04108; G06F 2203/04107; G06F 2203/04114
See application file for complete search history.

(56) References Cited

U.S. PATENT DOCUMENTS

| | | |
|---|---|---|
| 2012/0146958 A1 | 6/2012 | Oda |
| 2018/0239459 A1 | 8/2018 | Ahn |
| 2018/0267660 A1 | 9/2018 | Shepelev |
| 2019/0056823 A1 | 2/2019 | Stevenson |
| 2019/0146602 A1 | 10/2019 | Kadowaki |
| 2020/0371637 A1 | 11/2020 | Krah |
| 2022/0057894 A1 | 2/2022 | Koike |
| 2022/0083174 A1 | 3/2022 | Kim |

FOREIGN PATENT DOCUMENTS

| | | | | |
|---|---|---|---|---|
| CN | 112578918 A | 3/2021 | | |
| KR | 20200085965 A | * | 7/2020 | ............. G06F 3/044 |

\* cited by examiner

LOW LATENCY INPUT OBJECT DETECTION UNDER LOW GROUND MASS CONDITION

CROSS-REFERENCE TO RELATED APPLICATIONS

This application is a continuation of, and thereby claims benefit under 35 U.S.C. § 120 to, U.S. patent application Ser. No. 17/522,679 filed on Nov. 9, 2021, which is incorporated herein by reference in its entirety.

BACKGROUND

Input devices including proximity sensor devices (e.g., touchpads or touch sensor devices) are widely used in a variety of electronic systems. A proximity sensor device typically includes a sensing region, often demarked by a surface, in which the proximity sensor device determines the presence, location, or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are often combined with display devices to operate as input-display devices (such as touch screens integrated in cellular phones).

Some proximity sensor devices are configured to detect capacitive pen signals. The capacitive pen transmits the capacitive pen signals responsive to the capacitive pen detecting an uplink signal from the proximity sensor device. The proximity sensor device transmits the uplink signal that a sensor in the tip of a capacitive pen detects. The detection circuit in the capacitive pen uses the body of the capacitive pen as a reference. Namely, the detection circuit detects the uplink signal based on the difference between signals from the capacitive pen tip and the capacitive pen body. However, when a proximity sensor device transmits the uplink signal and the user's palm is in the sensing region, both the palm of a user's hand and the capacitive pen tip receive the same signal. As a result, the user's palm couples the same uplink signal to the capacitive pen body, so that the capacitive pen body and the capacitive pen tip both receive same signal. In this case, the difference will be zero, so the detection circuit does not detect the uplink signal. As a result, the capacitive pen does not transmit the capacitive pen signals, and the proximity sensor device does not detect the capacitive pen.

SUMMARY

In general, it is an object of the present disclosure to describe a processing system configured to detect an input object proximate the processing system. In an exemplary embodiment, the processing system includes sensor circuitry configured to make a determination, when the processing system is in a low ground mass (LGM) state, that a large object is proximate to sensor electrodes of the processing system. The sensor circuitry is further configured, in response to a determination that a large object is proximate the sensor electrodes while the processing system is in the LGM state, to drive a first group of the sensor electrodes with one of an inverted signal or a non-inverted signal and drive a second group of the sensor electrodes with a static DC voltage.

It is another object of the present disclosure to describe a method of detecting an input object proximate a processing system. The method includes: i) making a determination that the processing system is in a low ground mass (LGM) state; and ii) making a determination that a large object is proximate sensor electrodes of the processing system. In response to a determination that the processing system is in an LGM state and that a large object is proximate the sensor electrodes of the processing system, the method further includes driving a first group of the sensor electrodes with one of an inverted signal or a non-inverted signal and driving a second group of the sensor electrodes with a static DC voltage.

It is another object of the present disclosure to describe an input device configured to detect an input object proximate the input device. The input device includes sensor electrodes configured to transmit uplink signals to the input object and a processing system coupled to the sensor electrodes. The processing system is configured to make a determination that the input device is in a low ground mass (LGM) state and to make a determination that a large object is proximate the sensor electrodes. In response to a determination that the input device is in an LGM state and that a large object is proximate the sensor electrodes, the processing system drives a first group of the sensor electrodes with one of an inverted signal or a non-inverted signal and drives a second group of the sensor electrodes with a static DC voltage.

Other aspects of the disclosure will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

Figure 1:
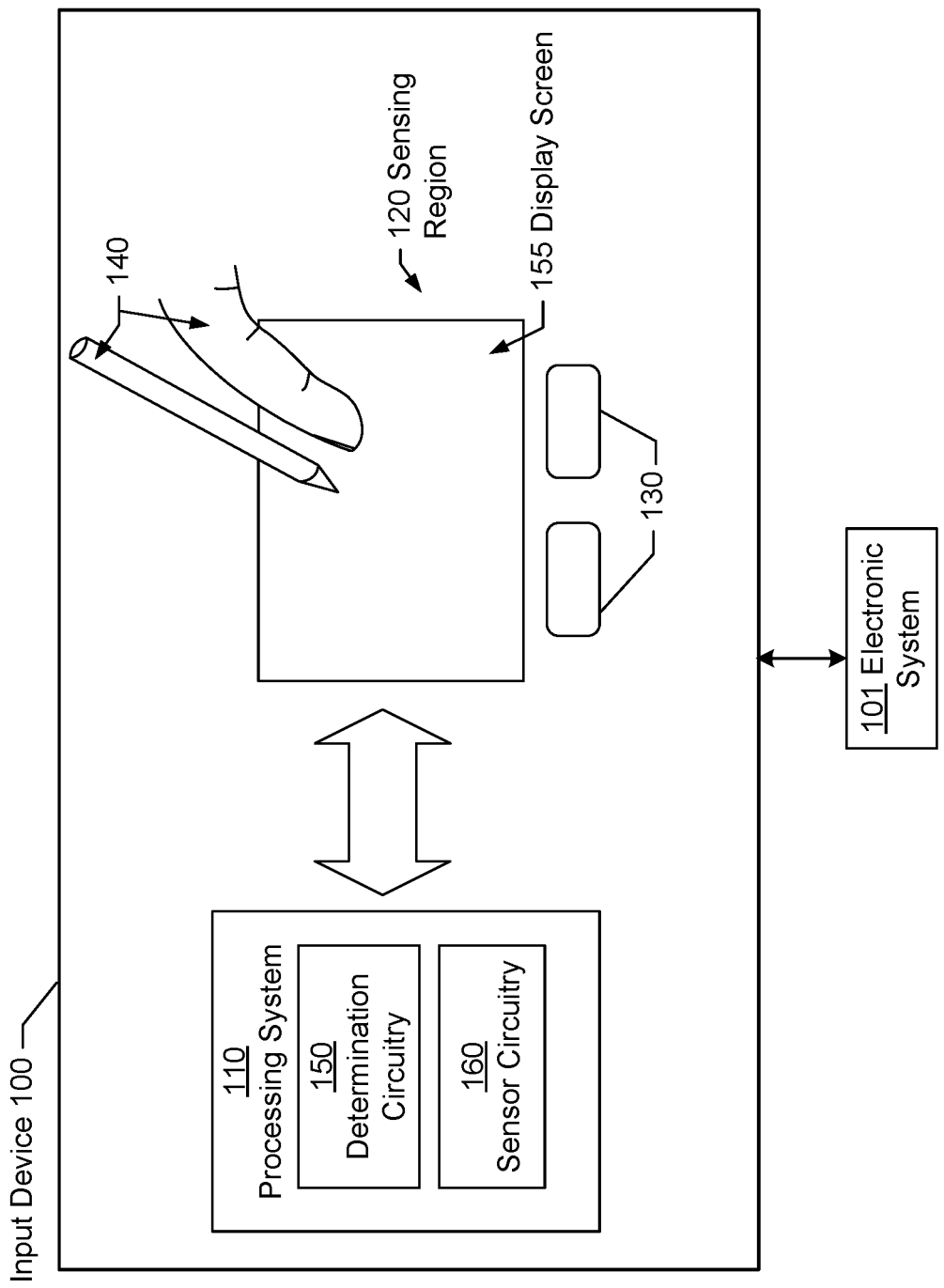
FIG. 1 shows a block diagram of an input device in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The present disclosure describes an input device that provides quicker detection of a capacitive pen (i.e., stylus or active pen) under low ground mass (LGM) conditions. When an input device (e.g., a mobile phone) is plugged in and charging or is held in the user's hand, a good ground condition exists. However, if the input device is resting on a table or other object, the input device may be in an LGM state (i.e., does not have a good ground condition). In the LGM state, the detection circuit in the capacitive pen may fail to detect the uplink signal transmitted by the proximity sensor device because both the palm of the user's hand in contact with the surface of the proximity sensor device and the capacitive pen tip receive the same signal. In this case, the difference in the signals is substantially zero, so that the uplink signal is not received by the capacitive pen. As a result of the capacitive pen failing to detect the uplink signal, the capacitive pen fails to transmit capacitive pen signals and, correspondingly, the input device fails in detecting the capacitive pen.

Under LGM conditions, there are a few cases that may occur when the capacitive pen and palm approach the surface of the proximity sensor device. In Case 1, the hand of the user reaches the surface of the proximity sensor device before the capacitive pen. In Case 2, the tip of the input object reaches the surface before the hand. In Case 3, the tip of the input object and the hand reach the surface of the proximity sensor device at the same time. A traditional uplink drive in which the whole panel is driven at a same phase works for Case 2, but not for Case 1 and Case 3. The present disclosure describes an input device that reduces the latency associated with Case 1 in accordance with one or more embodiments.

Turning now to the figures, FIG. 1 shows a block diagram of an exemplary input device 100, in accordance with embodiments of the disclosure. The input device 100 may be configured to provide input to an electronic system 101. The input device 100 comprise processing system 110, display screen 155, and one or more control buttons 130. Processing system 110 includes determination circuitry 150 and sensor circuitry 160 and is operatively coupled to display screen 155 and control buttons 130.

As used in this document, the term "electronic system 101" (or "electronic device 101") broadly refers to any system capable of electronically processing information. Examples of electronic systems may include personal computers of all sizes and shapes (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). Additionally, the electronic system could be a host or a slave to the input device.

The input device 100 may be implemented as a physical part of the electronic system 101. In the alternative, the input device 100 may be physically separate from the electronic system 101. The input device 100 may be coupled to (and communicate with) components of the electronic system 101 using various wired or wireless interconnections and communication technologies, such as buses and networks. Example technologies may include Inter-Integrated Circuit (I2C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards. In the example of FIG. 1, the input device 100 may correspond to a proximity sensor device (such as a "touchpad" or a "touch sensor device") configured to sense input provided by one or more input objects 140 in a sensing region 120. Example input objects include a finger, palm, capacitive pen, and other such devices. The sensing region 120 may encompass any space above, around, in and/or near the input device 100 in which the input device 100 is able to detect a user input (e.g., provided by one or more input objects 140). The sizes, shapes, and locations of particular sensing regions may vary depending on actual implementations.

In some embodiments, the sensing region 120 detects inputs involving no physical contact with any surfaces of the input device 100. In other embodiments, the sensing region 120 detects inputs involving contact with an input surface (e.g., a touch screen) of the input device 100 coupled with some amount of applied force or pressure.

The input device 100 may utilize any combination of sensor components and sensing technologies to detect user input in the sensing region 120. The input device 100 includes one or more sensing elements for detecting user input. As several non-limiting examples, the input device 100 may use capacitive, elastive, resistive, inductive, magnetic, acoustic, ultrasonic, and/or optical techniques. The input device 100 may also include one or more physical or virtual buttons 130 to collect user input.

In some embodiments, the input device 100 may utilize capacitive sensing technologies to detect user input. For example, the input device 100 may include in the sensing region 120 one or more capacitive sensing elements (e.g., sensor electrodes) that create an electric field. The input device 100 may detect inputs from the input object 140 based on changes in the capacitance of the sensor electrodes. More specifically, an object in contact with (or in close proximity to) the electric field may cause changes in the voltage and/or current in the sensor electrodes. Such changes in voltage and/or current may be detected as "signals" indicative of user input. The sensor electrodes may be arranged in arrays or other regular or irregular patterns of capacitive sensing elements to create electric fields. These electric fields comprise uplink signals that may be detected by an input object 140. In some implementations, some sensing elements may be ohmically shorted together to form larger sensor electrodes. Some capacitive sensing technologies may utilize resistive sheets that provide a uniform layer of resistance.

Some capacitive sensing technologies may be based on "self capacitance" (also referred to as "absolute capacitance") or mutual capacitance (also referred to as "transcapacitance") or both. Absolute capacitance sensing methods detect changes in the capacitive coupling between sensor electrodes and an input object. Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more transmitter sensor electrodes (also "transmitter electrodes" or "transmitter") and one or more receiver sensor electrodes (also "receiver electrodes" or "receiver").

The processing system 110 may be configured to operate the hardware of the input device 100 to detect input in the sensing region 120. The processing system 110 may include parts of, or all of, one or more integrated circuits (ICs) and/or other circuitry components. In some embodiments, the processing system 110 also includes electronically-readable instructions, such as firmware code, software code, and the like. In some embodiments, components composing the processing system 110 are located together, such as near sensing element(s) of the input device 100. In other embodiments, components of processing system 110 are physically separate with one or more components close to the sensing element(s) of the input device 100, and one or more components elsewhere.

For example, the input device 100 may be a peripheral coupled to a computing device, and the processing system 110 may include software configured to run on a central processing unit of the computing device and one or more ICs (perhaps with associated firmware) separate from the central processing unit. As another example, the input device 100 may be physically integrated in a mobile device, and the processing system 110 may include circuits and firmware that are part of a main processor of the mobile device. In some embodiments, the processing system 110 is dedicated to implementing the input device 100. In other embodiments, the processing system 110 also performs other functions, such as operating display screens, driving haptic actuators, and the like. For example, the processing system 110 may be part of an integrated touch and display controller.

In some embodiments, the processing system 110 may include sensor circuitry 160 configured to perform transcapacitance sensing by i) driving one or more transmitter sensor electrodes to transmit transmitter signals and ii) receiving from one or more receiver sensor electrodes the resulting signals that result from the capacitive coupling between the transmitter sensor electrodes and the receiver sensor electrodes (also "receiver electrodes" or "receiver").

In some embodiments, the processing system 110 may include determination circuitry 150 configured to obtain measurements of the resulting signals received by the receiver sensor electrodes. The determination circuitry 150 is configured to determine from the measurements when at least one input object is in the sensing region 120, determine signal-to-noise ratio (SNR), determine positional information of an input object, identify a gesture, determine an action to perform based on the gesture, a combination of gestures or other information, or perform other operations.

In some embodiments, the processing system 110 operates the sensor electrode(s) of the input device 100 to produce electrical signals indicative of input (or lack of input) in the sensing region 120. The processing system 110 may perform any appropriate amount of processing on the electrical signals in producing the information provided to the electronic system 101. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. A baseline is an estimate of the raw measurements of the sensing region when an input object is not present. For example, a capacitive baseline is an estimate of the background capacitance of the sensing region 120. Each sensor electrode may have a corresponding individual value in the baseline. As yet further examples, the processing system 110 may determine positional information, recognize inputs as commands, recognize handwriting, and the like.

In some embodiments, the input device 100 includes a touch screen interface, and the sensing region 120 overlaps at least part of an active area of a display screen 155. The input device 100 may include substantially transparent sensor electrodes overlaying the display screen 155 and provide a touch screen interface for the associated electronic system. The display screen 155 may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen 155 may share physical elements. For example, some embodiments may utilize some of the same electrical components for displaying and sensing. In various embodiments, one or more display electrodes of a display device may be configured for both display updating and input sensing. As another example, the display screen 155 may be operated in part or in total by the processing system 110.

The sensing region 120 and the display screen 155 may be integrated and follow on-cell or in-cell or hybrid architectures. In other words, display screen 155 may be composed of multiple layers (e.g., one or more polarizer layers, color filter layers, color filter glass layers, thin film transistor (TFT) circuit layers, liquid crystal material layers, TFT glass layers, etc.). The sensor electrodes may be disposed on one or more of the layers. For example, the sensor electrodes may be disposed on the TFT glass layer and/or the color filter glass layer. Moreover, the processing system 110 may be part of an integrated touch and display controller that operates both the display functions and the touch sensing functions.

Figure 2A:
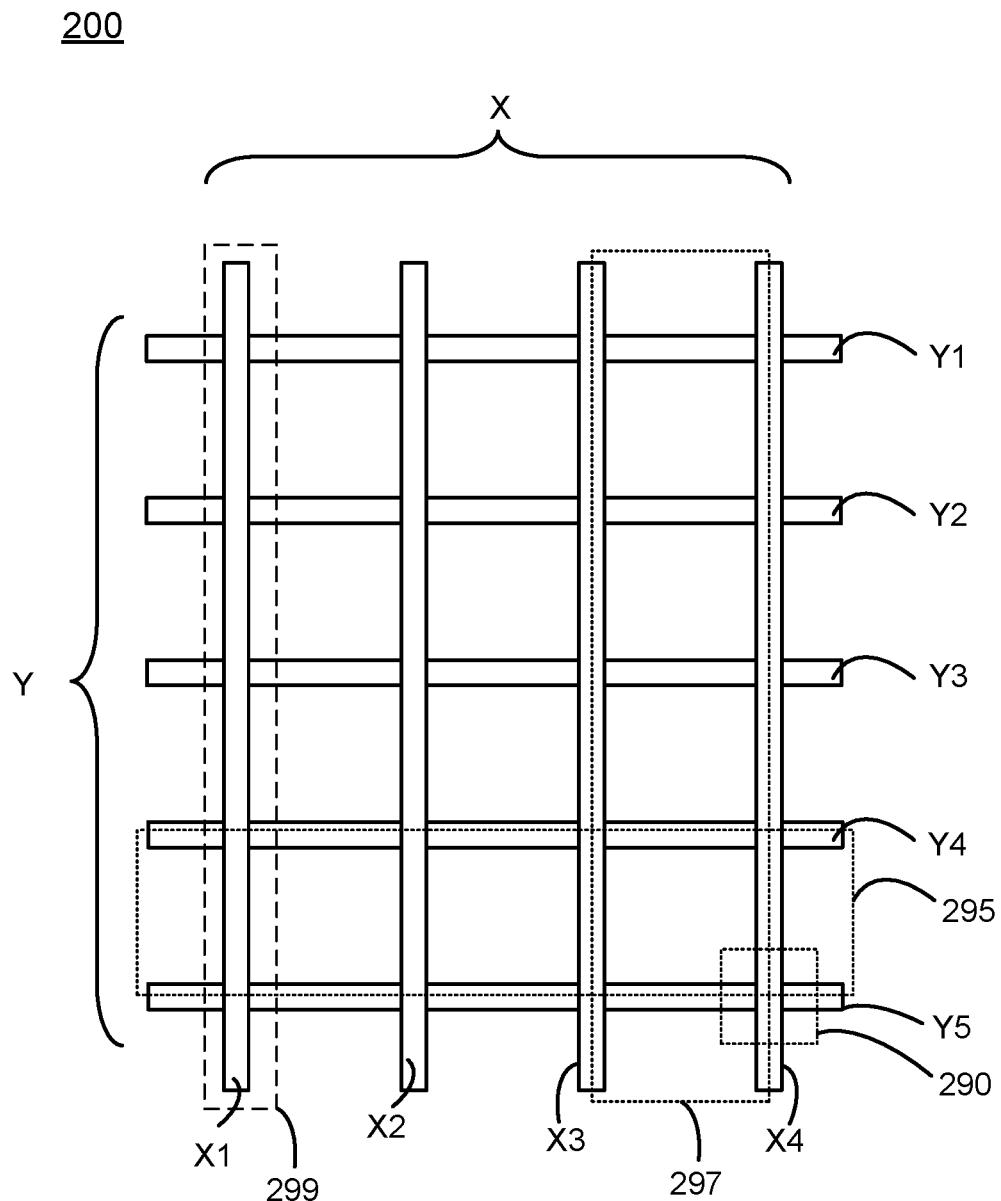
FIG. 2A shows a portion of an example sensor electrode pattern may be utilized in a sensor to generate all or part of the sensing region of the input device according to various embodiments.

FIG. 2A shows a portion of an example sensor electrode pattern 200 which may be utilized in a sensor to generate all or part of the sensing region of input device 100, according to various embodiments. Input device 100 is configured as a capacitive sensing input device when utilized with a capacitive sensor electrode pattern. For purposes of clarity of illustration and description, a non-limiting simple rectangular sensor electrode pattern 200 with a first plurality of sensor electrodes X and a second plurality of sensor electrodes Y is illustrated. Although the labels X and Y are utilized and FIG. 2A illustrates that the X and Y sensor electrode subsets are substantially orthogonal to one another, an orthogonal relationship between the crossing first and second subsets of sensor electrodes is not required.

In one embodiment, the sensor electrodes X and Y may be arranged on different sides of the same substrate. For example, each of the first plurality X and second plurality of sensor electrode may be disposed on one of the surfaces of a substrate. In one such an embodiment, sensor electrodes X are disposed on a first side of a substrate, while sensor electrodes Y are disposed on an opposing side of the substrate. In other embodiments, the sensor electrodes may be arranged on different substrates. For example, each of the each of the first and second plurality of sensor electrode(s) may be disposed on surfaces of separate substrates which may be adhered together.

In another embodiment, the sensor electrodes are all located on the same side or surface of a common substrate. In one example, a first plurality of the sensor electrodes comprises jumpers in regions where the first plurality of sensor electrodes crossover the second plurality of sensor electrodes, where the jumpers are insulated from the second plurality of sensor electrodes. In one or more embodiments, the sensor electrodes may comprise at least one display electrode configured for display updating and capacitive sensing. The display electrode may be selected from a list comprising, but not limited to, a segment of a segmented Vcom electrode, a source electrode, a gate electrode, a cathode electrode, and an anode electrode.

The first plurality of sensor electrodes may extend in a first direction, and the second plurality of sensor electrodes may extend in a second direction. The second direction may be similar to or different from the first direction. For example, the second direction may be parallel with, perpendicular to, or diagonal to the first direction. Further, the sensor electrodes may each have the same size or shape or differing size and shapes. In one embodiment, the first plurality of sensor electrodes may be larger (larger surface area) than the second plurality of sensor electrodes. In other embodiments, the first plurality and second plurality of sensor electrodes may have a similar size and/or shape. Thus, the size and/or shape of the one or more of the sensor electrodes may be different than the size and/or shape of another one or more of the sensor electrodes. Nonetheless, each of the sensor electrodes may be formed into any desired shape on their respective substrates.

In other embodiments, one or more of sensor electrodes are disposed on the same side or surface of the common substrate and are isolated from each other in the sensing region 120.

The illustrated sensor electrode pattern in FIG. 2A is composed of sensor electrodes X (X1, X2, X3, X4) which may be used as both transmitter electrodes and receiver electrodes, and sensor electrodes Y (Y1, Y2, Y3, Y5) which may be used as both transmitter electrodes and receiver electrodes. Sensor electrodes X and Y overlay one another in an orthogonal arrangement, in this example. It is appreciated that in a crossing sensor electrode pattern, such as the illustrated example of FIG. 2A, some form of insulating material or substrate can be disposed between sensor electrodes Y and X. For purposes of clarity, depictions of these substrates and insulators have been omitted herein.

In the illustrated example of FIG. 2A, capacitive pixels may be measured via transcapacitive sensing. For example, capacitive pixels may be located at regions where transmitter and receiver electrodes interact. The pixels may have a variety of shapes, depending on the nature of the interaction. In the illustrated example, capacitive pixels are located where transmitter and receiver electrodes overlap one another.

Capacitive coupling 290 illustrates one of the capacitive couplings generated by sensor electrode pattern 200 during transcapacitive sensing with sensor electrode Y5 as a transmitter electrode and sensor electrode X4 as a receiver electrode or with sensor electrode X4 as a transmitter electrode and sensor electrode Y5 as a receiver electrode.

Capacitive coupling 295 illustrates one of the capacitive couplings generated by sensor electrode pattern 200 during transcapacitive sensing with sensor electrode Y5 as a transmitter electrode and sensor electrode Y4 as a receiver electrode or with sensor electrode Y4 as a transmitter electrode and sensor electrode Y5 as a receiver electrode.

Capacitive coupling 297 illustrates one of the capacitive couplings generated by sensor electrode pattern 200 during transcapacitive sensing with sensor electrode X4 as a transmitter electrode and sensor electrode Y3 as a receiver electrode or with sensor electrode X3 as a transmitter electrode and sensor electrode X4 as a receiver electrode.

When accomplishing transcapacitive measurements, the capacitive couplings, are areas of localized capacitive coupling between sensor electrodes. The capacitive coupling between sensor electrodes changes with the proximity and motion of input objects in the sensing region associated with sensor electrodes. In some instances, areas of capacitive coupling such as 290, 295, and 297 may be referred to as capacitive pixels. It should be noted that the different types of capacitive couplings 290, 295, 297 have different shapes, sizes, and or orientations from one another due to the particular nature of the interactions.

As another example, absolute capacitive couplings may increase where the area of overlap between a sensor electrode and a user input depending on the series coupling of the user through a voltage reference (e.g., system ground) from which the respective receiver is modulated. As one example, dashed box 299 represents an area of absolute capacitive coupling which may be associated with sensor electrode X1; other sensor electrodes similar have areas of absolute capacitive coupling. As a further example, the absolute capacitive series couplings may also include the effect of user coupling to other transmitter electrodes in parallel to the coupling to the reference voltage.

Figure 2B:
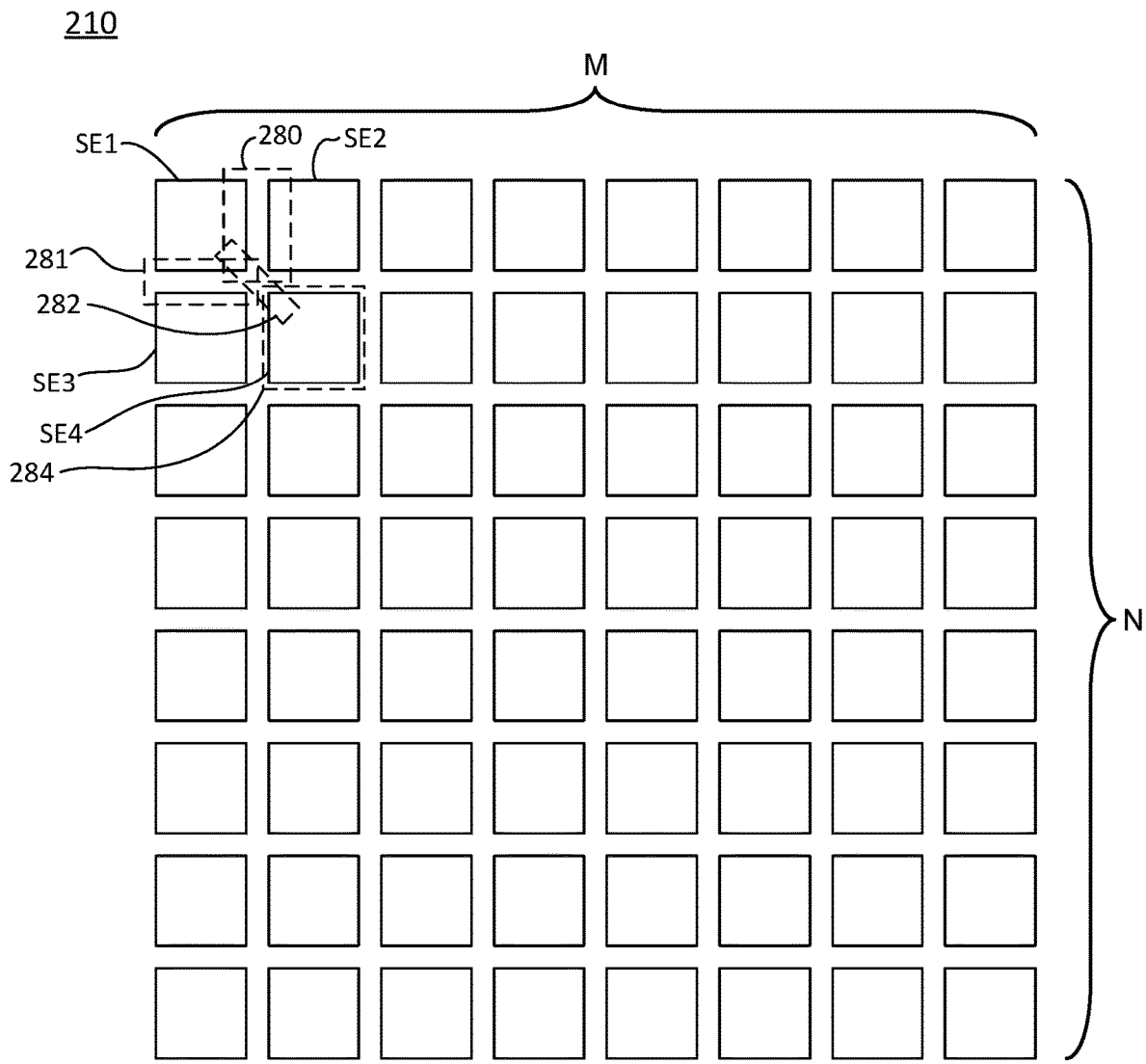
FIG. 2B illustrates an example matrix array of sensor electrodes, according to various embodiments.

FIG. 2B illustrates an example matrix array of sensor electrodes, according to various embodiments. As illustrated in FIG. 2B, the sensor electrodes 210 may be disposed in an N×M matrix array where each sensor electrode may be referred to as a matrix sensor electrode. In one embodiment, each sensor electrode of sensor electrodes is substantially similar size and/or shape. In one embodiment, one or more of sensor electrodes of the matrix array of sensor electrodes may vary in at least one of size and shape. Each sensor electrode of the matrix array may correspond to a pixel of a capacitive image. Further, two or more sensor electrodes of the matrix array may correspond to a pixel of a capacitive image.

In various embodiments, each sensor electrode of the matrix array may be coupled a separate capacitive routing trace of a plurality of capacitive routing traces. In various embodiments, the sensor electrodes 210 comprises one or more gird electrodes disposed between at least two sensor electrodes of sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. The voltage electrode may be selected from a list comprising, but not limited to, a Vcom electrode, a segment of a segmented Vcom electrode, a source electrode, a gate electrode, a cathode electrode, and an anode electrode. Although the sensor electrodes may be electrically isolated on the substrate, the electrodes may be coupled together outside of the sensing region 120—e.g., in a connection region. In one embodiment, a floating electrode may be disposed between the grid electrode and the sensor electrodes. In one particular embodiment, the floating electrode, the grid electrode and the sensor electrode comprise the entirety of a common electrode of a display device. Each sensor electrode may be individually coupled to the processing system or coupled to the processing system through one or more multiplexers or switching mechanisms.

In the illustrated example of FIG. 2B, capacitive pixels may be measured via transcapacitive sensing. For example, capacitive pixels may be located at regions where transmitter and receiver electrodes interact. In the illustrated example, capacitive pixels are located where transmitter and receiver electrodes are coupled to one another. For example, capacitive coupling 280 illustrates one of the capacitive couplings generated by sensor electrode pattern 210 during transcapacitive sensing with sensor electrode SE1 as a transmitter electrode and sensor electrode SE2 as a receiver electrode or with sensor electrode SE1 as a transmitter electrode and sensor electrode SE2 as a receiver electrode.

Capacitive coupling 281 illustrates one of the capacitive couplings generated by sensor electrode pattern 210 during transcapacitive sensing with sensor electrode SE1 as a transmitter electrode and sensor electrode SE3 as a receiver electrode or with sensor electrode SE3 as a transmitter electrode and sensor electrode SE1 as a receiver electrode.

Capacitive coupling 282 illustrates one of the capacitive couplings generated by sensor electrode pattern 210 during transcapacitive sensing with sensor electrode SE1 as a transmitter electrode and sensor electrode SE4 as a receiver electrode or with sensor electrode SE4 as a transmitter electrode and sensor electrode SE1 as a receiver electrode.

When accomplishing transcapacitive measurements, the capacitive couplings, are areas of localized capacitive coupling between sensor electrodes. The capacitive coupling between sensor electrodes changes with the proximity and motion of input objects in the sensing region associated with sensor electrodes. As one example, dashed box 284 represents an area of absolute capacitive coupling which may be associated with sensor electrode SE4; other sensor electrodes in sensor electrode pattern 210 similar have areas of absolute capacitive coupling. The absolute capacitance of any one or more of the sensor electrodes in sensor electrode pattern 210 may also be measured.

In some embodiments, sensor electrode pattern 200 is "scanned" to determine these capacitive couplings. That is, sensor circuitry 160 drives the transmitter electrodes to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined based on the multiple results of multiple independent codes.

In one embodiment, a first sensor electrode may be driven by sensor circuitry 160 with a first transmitter signal based on a first code of a plurality of distinct digital codes and a second sensor electrode may be driven with a second transmitter signal based on a second code of the plurality of distinct digital codes, where the first code may be orthogonal to the second code. With regard to FIG. 2B, the sensor electrodes may be driven and received by sensor circuitry 160 such that at least two sensor electrodes may be simultaneously driven. In one or more embodiments, each of the sensor electrodes may be simultaneously driven. In such an embodiment, each sensor electrode may be driven with a transmitter signal based on a different one of a plurality of orthogonal digital codes. Further, the sensor electrodes may be driven such that a first at least one sensor electrode is driven differently that a second at least sensor electrode. In one or more embodiments, the sensor electrodes are driven such that along each row and column alternating sensor electrodes are driven differently.

The receiver electrodes may be operated singly or in multiples to acquire resulting signals. The resulting signals may be used to determine measurements of the capacitive couplings at the capacitive pixels. Note that the receiver signals may also be multiplexed such that multiple electrodes may be measured with a single receiver (e.g., analog front end or "AFE"). Furthermore, the receiver multiplexer may be implemented such that the receiver is simultaneously coupled to and simultaneously receives resulting signals from multiple sensor electrodes. In such implementations, the resulting signals comprise coded results from the multiple sensor electrodes. Note in various embodiments, that multiple "absolute capacitance" electrodes may be driven simultaneously with the same modulation relative to a reference voltage and such that they are guarding each other, or some may be driven relative to each other modulated relative to a system reference voltage such that they measure both a transcapacitive and an absolute capacitive signal simultaneously.

A set of measurements from the capacitive couplings or pixels form a "capacitive image" (also "capacitive frame") representative of the transcapacitive couplings. For example, a capacitive image may be made up of a set of capacitive pixels, such as capacitive coupling 290. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region. Also, in various embodiments, a "capacitive image" may be formed by absolute capacitive measurements of a matrix array of sensor electrodes (e.g., sensor electrode pattern 210 of FIG. 2B). In such embodiments, sensor electrodes may be operated for absolute capacitive sensing depending on the multiplexer settings. For example, the sensor electrodes may be grouped into rows, columns and/or other combinations of sensor electrodes.

A set of measurements from the capacitive coupling/pixels along one axis may be taken to form a "transcapacitive profile" (also "profile frame") representative of the capacitive couplings at the capacitive couplings/pixels between parallel electrodes on an axis (e.g., electrodes X or Y). For example, a transcapacitive profile may be made up from a set of horizontal capacitive pixels, such as capacitive coupling/pixel 295, or from a set of vertical pixels, such as capacitive coupling/pixel 297. Multiple transcapacitive profiles along one or more axes may be acquired over multiple time periods, and differences between them used to derive information about input in the sensing region. For example, successive transcapacitive profiles acquired over successive periods of time for an axis can be used to track the motion(s) of one or more input objects entering, exiting, and within the sensing region. Alternately, a set of measurements from the capacitive coupling along an axis may be taken from an "absolute capacitive profile" (also called "ABS profile") representative of the capacitive couplings between the parallel electrodes on an axis and the series capacitance from the user input through the coupling to the reference electrode which the absolute receivers are modulated.

As will be described herein, in some embodiments, combined sensing can be performed by driving a sensing signal onto a sensor electrode (e.g., sensor electrode X1) and simultaneously with the driving of that sensor electrode, other sensor electrodes that cross and do not cross that sensor electrode (e.g., sensor electrodes Y that cross sensor electrode X1 and one or more other sensor electrodes X which do not cross sensor electrode X1) may be used as receivers to obtain transcapacitive measurements between themselves and the driven sensor electrode.

Figure 3:
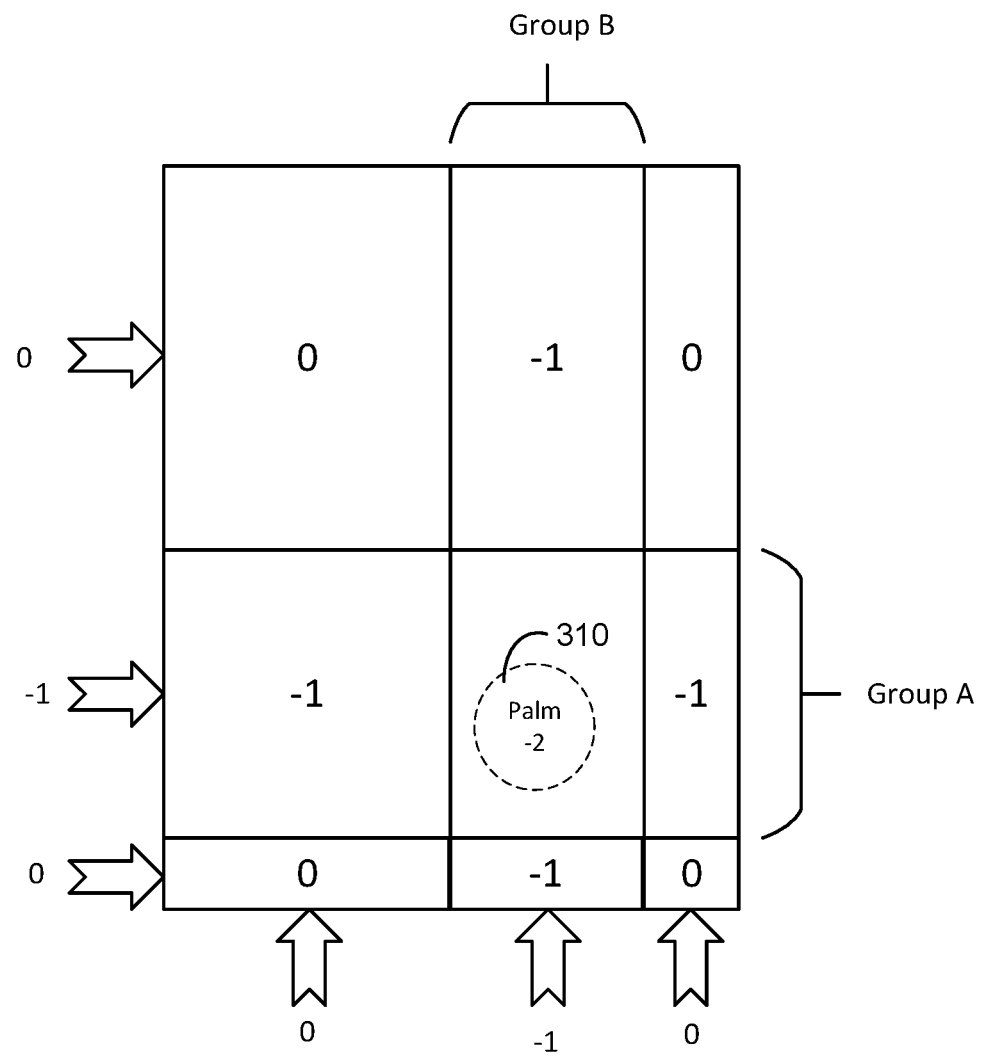
FIG. 3 illustrates capacitive pen detection according to one or more embodiments.

FIG. 3 illustrates a method of detecting a capacitive pen according to one or more embodiments of the disclosure. Under normal conditions, the driving circuitry 160 drives the whole panel with uplink waveform simultaneously. This method works for the "well grounded" condition where a finger or palm touches the panel or the LGM condition without a palm or finger on the panel. The method disclosed in FIG. 3 is different than the normal method and is ideally suited for rapid detection of the input object 140 in Case 1, wherein a large input object (e.g., palm, finger) reaches the surface of sensing region 120 before the input object 140 (i.e., the most common case).

In FIG. 3, it is assumed that touch sensing is actively running for every frame. If the sensor circuitry 160 detects the palm of the user in sensing region 120 under LGM conditions, then the sensor circuitry 160 drives the sensor electrodes in the sensing region 120 according to FIG. 3 to generate the uplink signals.

In FIG. 3, in a first frame (not shown), a large input object (e.g., a palm or finger) is detected at location 310. Further, an LGM state of the input device has already been detected for the input device 100. In response to the detection of the large input object at location 310 and the detection of the LGM state, the sensor circuitry 160 during a second subsequent frame uses an inverted signal (represented as "−1") to drive the sensor electrodes in the rows and columns of sensor electrodes that are overlapped by location 310. The sensor circuitry 160 connects all of the remaining rows and columns of sensor electrodes to system ground or to another static DC voltage (represented as "0"). The "0" means that no modulating signal is applied, but the sensor electrodes are not left floating.

Thus, the disclosed method in FIG. 3 drives an inverted waveform for rows of sensor electrodes (Group A) and columns of sensor electrodes (Group B) that are covered by region 310 where the palm of the user has been detected. The disclosed method provides no drive signal for the remaining rows and columns of sensor electrodes. As a result of the pattern of drive signals in FIG. 3, the input device 100 maximizes the difference between the drive signals at location 310 (where the large input object touches the panel) and the rest of the sensing region 120 where the input object 140 may touch the panel of the input device 100.

Figure 4:
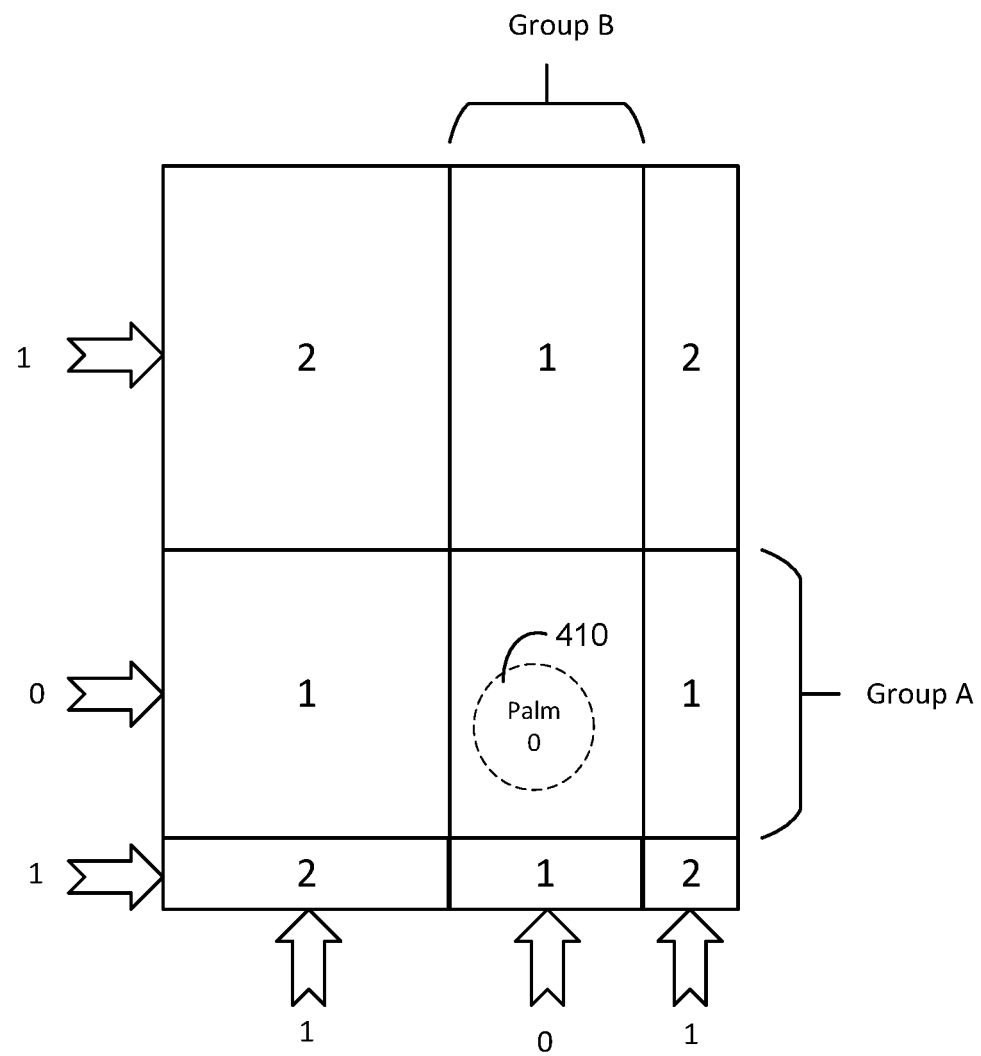
FIG. 4 illustrates capacitive pen detection according to one or more embodiments.

FIG. 4 illustrates a method of detecting a capacitive pen according to one or more embodiments of the disclosure. In FIG. 4, in a first frame (not shown), a large input object (e.g., a palm or finger) is detected at location 410. Further, an LGM state of the input device has already been detected for the input device 100. In response to the detection of the large input object at location 410 and the detection of the LGM state, the sensor circuitry 160 second subsequent frame connects the sensor electrodes in the rows and columns that are overlapped by location 410 to system ground or to another static DC voltage (represented as "0"). The sensor circuitry 160 in the second subsequent frame uses a non-inverted signal (represented as "1") to drive the sensor electrodes in all of the remaining rows and columns of sensor electrodes.

Thus, the disclosed method in FIG. 4 uses a system ground or another static DC voltage to drive the rows of sensor electrodes (Group B) and columns of sensor electrodes (Group B) that are covered by region 410 where the palm of the user has been detected. The disclosed method uses a non-inverted signal for the remaining rows and columns of sensor electrodes outside of Group A and Group B. As a result of the pattern of drive signals in FIG. 4, the input device 100 maximizes the difference between the drive signals at location 410 (where the large input object touches the panel) and the rest of the sensing region 120 where the input object 140 may touch the panel of the input device 100.

Figure 5:
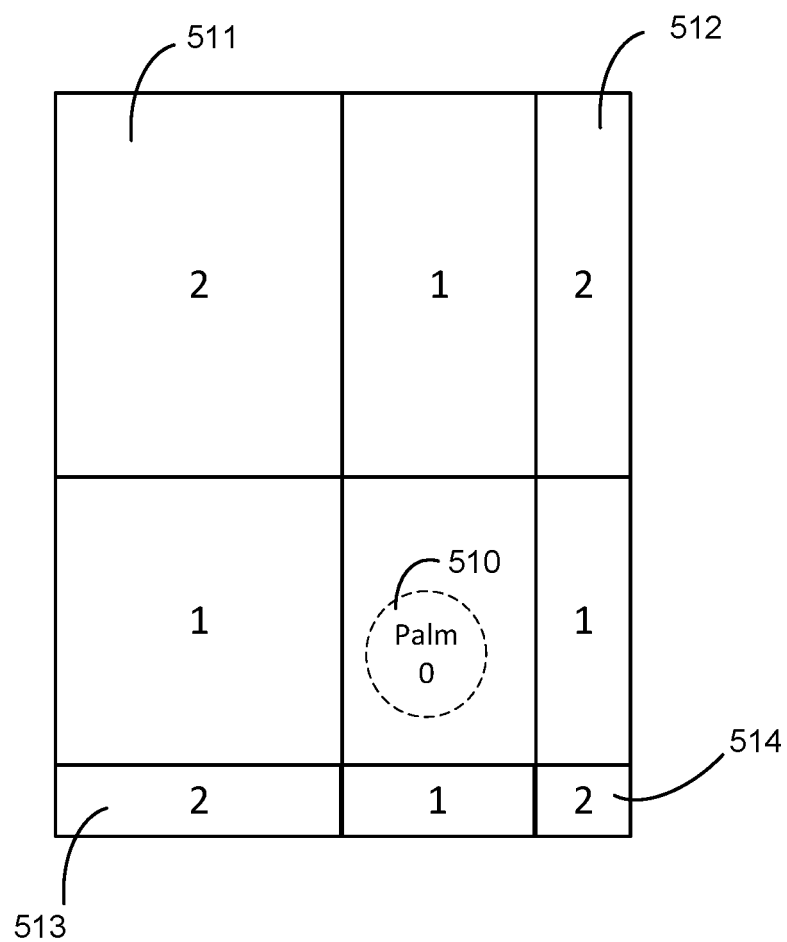
FIG. 5 illustrates normalized uplink signal levels during pen detection in FIG. 3 and FIG. 4 according to one or more embodiments.

FIG. 5 illustrates normalized uplink signal levels during capacitive pen detection in FIG. 3 according to one or more embodiments. In FIG. 5, the uplink signal values in FIG. 3 are normalized using the location 510 where the large input object is detected as a zero reference. Thus, location 510, where a user's palm touches the panel, has an uplink signal level of "0". The four (4) regions 511-514 that are not coupled to location 510 (i.e., rows and columns of sensor electrodes that do not intersect location 510) have a signal level of "2". The remaining four (4) regions have either rows of sensor electrodes or columns of sensor electrodes, but not both, that intersect with location 410, thereby producing uplink signal levels of "1".

The uplink transmission patterns of FIGS. 3 and 4 minimize the uplink signal amplitude near location 510 in FIG. 5 and maximizes the value at all other areas (ranges from +1 to +2). The differences in the uplink signals determines the signal level seen by the input object 140 attempting to receive the uplink signals. As a result, the input object 140 may be detected for all the regions not covered by palm within one (1) frame, thereby reducing latency by, for example, 16.7 milliseconds.

Figure 6:
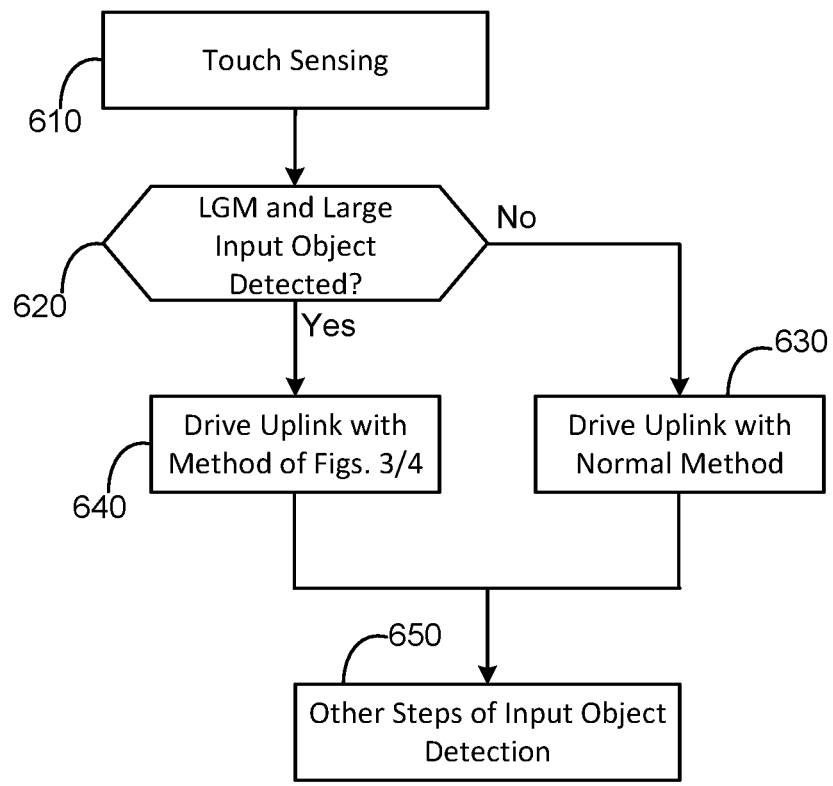
FIG. 6 is a flow diagram illustrating uplink driving according to one or more embodiments.

FIG. 6 is a flow diagram illustrating uplink driving according to one or more embodiments. In block 610, touch sensing happens regularly at a certain frame rate (e.g., once per frame). At some point, the sensor circuitry 160 in block 620 determines if a low ground mass condition and a large input object (e.g., user palm) have both been detected. If No in block 620, then the driving circuitry 160 in block 630 drives the sensor electrodes in the entire panel with non-inverted signals using the normal method when the LGM condition is not detected or if no finger or palm or other object is touching the display panel.

If Yes in block 620, then the sensor circuitry 160 in block 640 drives the sensor electrodes in the sensing region using the method described in FIG. 3 or the method described in FIG. 4. After either block 630 or block 640, the input device 100 in block 650 continues to perform other steps of input object 140 detection, such as tracking the location of the input object 140 if the input object 140 transmits an acknowledgement signal.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system configured to detect an input object proximate the processing system comprising:
sensor circuitry configured to:

determine that the processing system is in a low ground mass (LGM) state, determine an object having a size exceeding the input object is proximate to a plurality of sensor electrodes, the plurality of sensor electrodes arranged in substantially orthogonal rows and columns and configured to transmit uplink signals to the input object; and in response to the object being determined proximate to the plurality of sensor electrodes and the processing system in the LGM state, drive a first group of the plurality of sensor electrodes with one of an inverted modulated signal or a non-inverted modulated signal, and drive a second group of the plurality of sensor electrodes with a static non-modulated DC voltage, wherein the first group of the plurality of sensor electrodes comprises at least one row of sensor electrodes that intersect a location where the object is proximate the plurality of sensor electrodes.

2. The processing system of claim 1, wherein the static non-modulated DC voltage is a system ground voltage.

3. The processing system of claim 1, wherein the input object is a capacitive pen.

4. The processing system of claim 1, wherein, when the processing system is not in LGM state, the sensor circuitry drives each of the plurality of sensor electrodes with the non-inverted modulated signal.

5. The processing system of claim 1, wherein the first group of the plurality of sensor electrodes comprises at least one column of sensor electrodes that intersect the location where the object is proximate the plurality of sensor electrodes.

6. The processing system of claim 5, wherein the second group of the plurality of sensor electrodes comprises at least one row of sensor electrodes that do not intersect the location where the object is proximate the plurality of sensor electrodes.

7. The processing system of claim 6, wherein the second group of the plurality of sensor electrodes comprises at least one column of sensor electrodes that do not intersect the location where the object is proximate the plurality of sensor electrodes.

8. A method of detecting an input object proximate a processing system comprising:

determine that the processing system is in a low ground mass (LGM) state, determine an object having a size exceeding the input object is proximate to a plurality of sensor electrodes, the plurality of sensor electrodes arranged in substantially orthogonal rows and columns and configured to transmit uplink signals to the input object; and in response to the object being determined proximate to the plurality of sensor electrodes and the processing system in the LGM state, drive a first group of the plurality of sensor electrodes with one of an inverted modulated signal or a non-inverted modulated signal, and drive a second group of the plurality of sensor electrodes with a static non-modulated DC voltage, wherein the first group of the plurality of sensor electrodes comprises at least one row of sensor electrodes that intersect a location where the object is proximate the plurality of sensor electrodes.

9. The method of claim 8, wherein the static non-modulated DC voltage is a system ground voltage.

10. The method of claim 8, wherein the input object is a capacitive pen.

11. The method of claim 8, wherein, when the processing system is not in LGM state, the method further includes driving each of the plurality of sensor electrodes with the non-inverted modulated signal.

12. The method of claim 8, wherein the first group of the plurality of sensor electrodes comprises at least one column of sensor electrodes that intersect the location where the object is proximate the plurality of sensor electrodes.

13. The method of claim 12, wherein the second group of the plurality of sensor electrodes comprises at least one row of sensor electrodes that do not intersect the location where the object is proximate the plurality of sensor electrodes.

14. The method of claim 13, wherein the second group of the plurality of sensor electrodes comprises at least one column of sensor electrodes that do not intersect the location where the object is proximate the plurality of sensor electrodes.

15. An input device configured to detect an input object proximate the input device comprising:

a plurality of sensor electrodes arranged in substantially orthogonal rows and columns and configured to transmit uplink signals to the input object; and a processing system coupled to the plurality of sensor electrodes, the processing system configured to:

determine that the processing system is in a low ground mass (LGM) state, determine an object having a size exceeding the input object is proximate to the plurality of sensor electrodes; and in response to the object being determined proximate to the plurality of sensor electrodes and the processing system in the LGM state, drive a first group of the plurality of sensor electrodes with one of an inverted modulated signal or a non-inverted modulated signal, and drive a second group of the plurality of sensor electrodes with a static non-modulated DC voltage, wherein the first group of the plurality of sensor electrodes comprises at least one row of sensor electrodes that intersect a location where the object is proximate the plurality of sensor electrodes.

16. The input device of claim 15, wherein the static non-modulated DC voltage is a system ground voltage.

17. The input device of claim 15, wherein the input object is a capacitive pen.

18. The input device of claim 15, wherein, when the processing system is not in LGM state, the processing system drives each of the plurality of sensor electrodes with the non-inverted modulated signal.

19. The input device of claim 15, wherein the first group of the plurality of sensor electrodes comprises at least one column of sensor electrodes that intersect the location where the object is proximate the plurality of sensor electrodes.

20. The input device of claim 19, wherein the second group of the plurality of sensor electrodes comprises:

at least one row of sensor electrodes that do not intersect the location where the object is proximate the plurality of sensor electrodes; and at least one column of sensor electrodes that do not intersect the location where the object is proximate the plurality of sensor electrodes.

* * * * *